(12) United States Patent
Pajukoski et al.

(10) Patent No.: US 9,246,650 B2
(45) Date of Patent: Jan. 26, 2016

(54) METHOD, APPARATUS AND COMPUTER PROGRAM FOR OPEN LOOP TRANSMISSION DIVERSITY

(75) Inventors: Kari Pajukoski, Oulu (FI); Esa Tiirola, Kempele (FI); Kari Hooli, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 1444 days.

(21) Appl. No.: 12/156,894

(22) Filed: Jun. 4, 2008

(65) Prior Publication Data

US 2009/0303978 A1 Dec. 10, 2009

(51) Int. Cl.
*H04L 5/00* (2006.01)

(52) U.S. Cl.
CPC .............. *H04L 5/0053* (2013.01); *H04L 5/0023* (2013.01)

(58) Field of Classification Search
CPC ..... H04L 5/0053; H04L 1/1861; H04L 5/001; H04L 5/0048; H04L 5/0055; H04L 1/0026; H04L 5/0023; H04L 27/2613; H04L 5/0007; H04L 1/1671; H04L 5/0016; H04L 5/0094; H04L 1/0031; H04L 1/1854; H04L 5/0037; H04L 1/0027; H04L 1/00; H04L 1/0057; H04L 1/1812; H04L 1/1896; H04L 25/0226; H04L 25/03343; H04L 5/0044; H04L 5/0057; H04L 5/0073; H04L 1/0061; H04L 1/0072; H04L 1/0088; H04L 1/1607; H04L 1/18; H04L 2025/03426; H04L 2025/03808; H04L 27/2607; H04L 5/005; H04L 5/0051; H04L 1/0025; H04L 1/0028; H04L 1/0041; H04L 1/0625; H04L 1/1819; H04L 1/1822; H04L 1/1858; H04L 2001/0097; H04L 23/02; H04L 25/03866; H04L 25/03898; H04L 27/2601; H04L 27/262; H04L 27/2636; H04L 27/2655; H04L 27/2675; H04L 5/0046; H04L 5/0085; H04L 5/0091; H04L 5/0092; H04L 5/14; H04L 69/30; H04L 1/0003; H04L 1/0009; H04L 1/0054; H04L 1/0071; H04L 1/04; H04L 1/08; H04L 1/1692; H04L 1/1829; H04W 72/042; H04W 72/0413; H04W 72/04; H04W 72/0406; H04W 28/06; H04W 72/0453; H04W 72/1284; H04W 24/10; H04W 28/04; H04W 52/325; H04W 56/00; H04W 72/02; H04W 72/12; H04W 72/1289; H04W 76/023; H04W 16/14; H04W 28/26; H04B 1/71055; H04B 1/71072
USPC ........................... 370/352, 342, 344; 455/522
See application file for complete search history.

(56) References Cited

U.S. PATENT DOCUMENTS

2005/0043031 A1* 2/2005 Cho et al. ....................... 455/450
2008/0075184 A1 3/2008 Muharemovic et al. ...... 375/260

(Continued)

FOREIGN PATENT DOCUMENTS

CN 1953349 A 4/2007
EP 2 056 515 A1 5/2009

(Continued)

OTHER PUBLICATIONS

Nokia Siemens Networks et al: "Cyclic Shift Hopping and DM RS Signaling" No. R1-072294, May 7, 2007, pp. 1-4, XP002494363 Retrieved from the Internet:URL:http://www.3gpp1.org/ftp/tsg_ran/WG1_RL1/TSGR1_49/Docs/R1-072294.zip>sections 1-3.

(Continued)

*Primary Examiner* — Khaled Kassim
(74) *Attorney, Agent, or Firm* — Harrington & Smith

(57) ABSTRACT

A symbol multiplied by a first constant amplitude zero auto-correlation code CAZAC reference signal RS is transmitted in a timeslot from a first antenna of a user equipment on a first physical uplink control channel in a manner that multiplexes with other user equipments. A symbol multiplied by a second CAZAC RS is transmitted in the timeslot from a second antenna of the user equipment on a second physical uplink control channel in a manner that multiplexes with other user equipments. The first and second CAZAC RSs are orthogonal to one another by at least one of the cyclic shifts or a cover code applied to at least one of the first and the second CAZAC RSs. The symbols may be the same or different, and may represent an ACK, a NACK, or a scheduling request indicator. These teachings extend to more than two transmit antennas.

12 Claims, 3 Drawing Sheets

(56) References Cited

U.S. PATENT DOCUMENTS

2008/0080472 A1* 4/2008 Bertrand et al. ............... 370/344
2008/0232327 A1* 9/2008 Kuroyanagi et al. ......... 370/335

FOREIGN PATENT DOCUMENTS

JP          2008048093 A      2/2008
WO     WO 2008/041675 A1     4/2008
WO     WO 2008/132073 A1    11/2008

OTHER PUBLICATIONS

Ericsson: "Uplink reference signals" 1-6, [Online] No. R1-063128, 10-16, Nov. 6, 2006, pp. 1-5, 20-27, XP002494361 31,33 Retrieved from the Internet:URL : http://www.3gpp.org/ftp/tsg_ran/WG1_RL1/TSGR1_47/Docs/R1-063128.zip> sections 1 and 2.1.2.

NTT Docomo et al: "Sequence Hopping and Cyclic-Shift Value Hopping for Uplink Reference Signal in E-UTRA", No. R1-071643, Mar. 26, 2007, pp. 1-4, XP002494362 Retrieved from the Internet: URL : http://www.3gpp1.org/ftp/tsg_ran/WG1_RL1/TSGR1_48b/Docs/R1-071643.zi p> sections 1, 3.

A Panasonic et al: "Necessity of the Scrambling for the Reference Signal of CQI in PUCCH" 3GPP Draft; R1-081795, 3rd Generation Partnership Project (3GPP), Mobile Competence Centre ; 650, Route Des Lucioles ; F-06921 Sophia-Antipolis Cedex ; France, vol. RAN WG1, no. Kansas City, USA; May 14, 2008, XP050110174, section 1.

"LTE Advanced Workshop; Summary of LTE Advanced Requirements" presented at the Workshop, Source: 3GPP TSG RAN Chairman; Doc. Number REV-080058, 7 pgs.

"Joint proposal on uplink ACK/NACK channelization", 3GPP TSG RAN WG1 Meeting #51 bis, Jan. 14-18, 2008, 6 pgs.

"3$^{rd}$ Generation Partnership Project' Technical Specification Group Radio Access Network; Evolved Universal Terrestrial Radio Access (E-UTRA); Physical Channels and Modulation (Release 8)", 3GPP TS 36.211 V8.2.0 (Mar. 2008), 67 pgs.

* cited by examiner

| CELL SPECIFIC CYCLIC SHIFT OFFSET | | RS ORTHOGONAL COVER | | |
|---|---|---|---|---|
| $\Delta_{offset}=0$ | $\Delta_{offset}=1$ | $OC_{index}=0$ | $OC_{index}=1$ | $OC_{index}=2$ |
| $CS_{index}=0$ | $CS_{index}=1$ | K=0 | | 12 |
| 1 | 2 | | 6 | 13 |
| 2 | 3 | 1 | | |
| 3 | 4 | | 7 | 14 |
| 4 | 5 | 2 | | |
| 5 | 6 | | 8 | 15 |
| 6 | 7 | 3 | | |
| 7 | 8 | | 9 | 16 |
| 8 | 9 | 4 | | |
| 9 | 10 | | 10 | 17 |
| 10 | 11 | 5 | | |
| 11 | 0 | | 11 | |

| ACK/NACK ORTHOGONAL COVER | | |
|---|---|---|
| $OC_{index}=0$ | $OC_{index}=1$ | $OC_{index}=2$ |
| K=0 | | 12 |
| | 6 | 13 |
| 1 | | |
| | 7 | 14 |
| 2 | | |
| | 8 | 15 |
| 3 | | |
| | 9 | 16 |
| 4 | | |
| | 10 | 17 |
| 5 | | |
| | 11 | |

FIG. 1

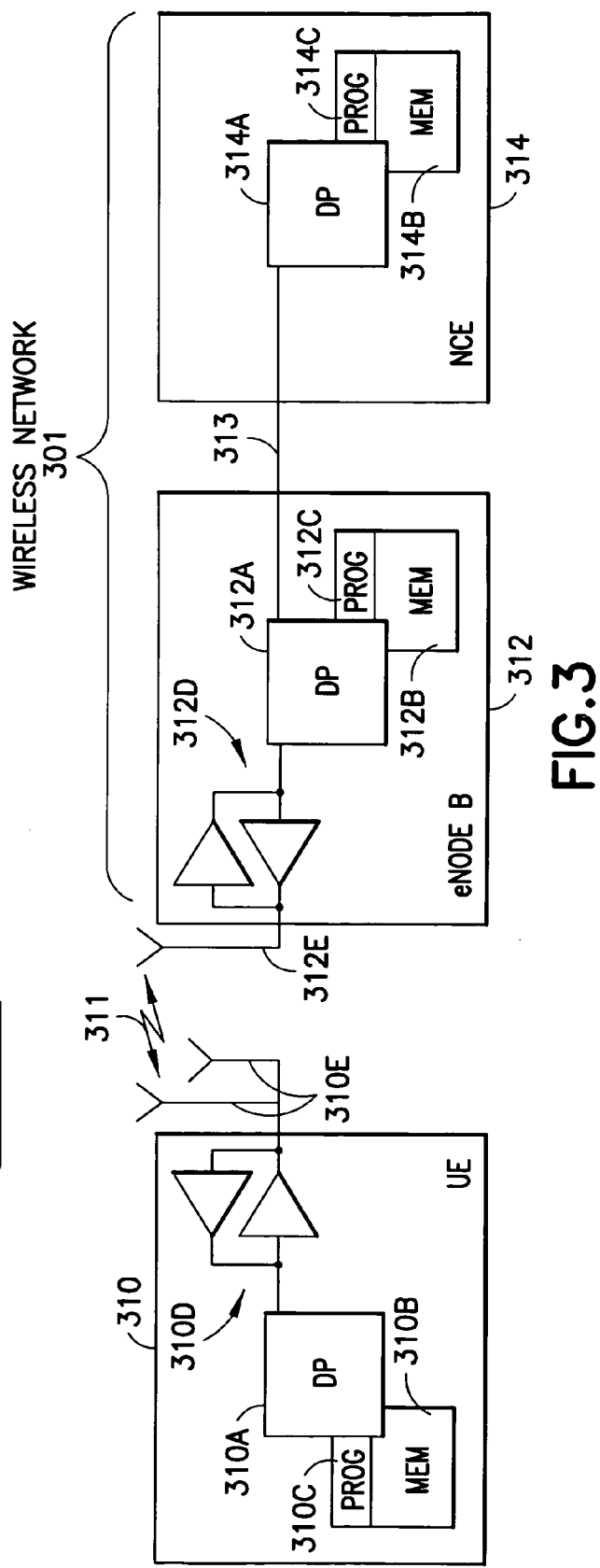

ns at the UE will be part of LTE-A [see for example
METHOD, APPARATUS AND COMPUTER PROGRAM FOR OPEN LOOP TRANSMISSION DIVERSITY

TECHNICAL FIELD

The exemplary and non-limiting embodiments of this invention relate generally to wireless communication systems, methods, devices and computer programs and, more specifically, relate to techniques for signalling different control information messages sent from a communication device.

BACKGROUND

Various abbreviations that appear in the specificaton and/or in the drawing figures are defined as follows:
3GPP third generation partnership project
ACK acknowledge
CAZAC constant amplitude zero autocorrelation code
CCE control channel element
CDM code division multiplex
CQI channel quality indicator
DL downlink
DM demultiplex
eNode B base station of an EUTRAN/LTE system
EUTRAN evolved UTRAN (also referred to as LTE or 3.9G)
FDD frequency division duplex
LTE long term evolution
ITU international telecommunication union
ITU-R ITU radiocommunication sector
LA location area
NACK negative ACK
OFDMA orthogonal frequency division multiple access
PUCCH physical uplink control channel
PDCCH physical downlink control channel
Rel. 8 3GPP Release 8
Rel. 9 3GPP Release 9
SRI scheduling request indicator
UE user equipment
UL uplink
UTRA universal mobile telecommunication system terrestrial radio access
UTRAN UTRA network A proposed communication system known as evolved UTRAN (E-UTRAN, also referred to as UTRAN-LTE, E-UTRA or 3.9G) is currently under development within the 3GPP. The current working assumption is that the DL access technique will be OFDMA, and the UL access technique will be SC-FDMA.

One specification of interest to these and other issues related to the invention is 3GPP TS 36.211, V8.2.0 (2008-03), 3rd Generation Partnership Project; Technical Specification Group Radio Access Network; Evolved Universal Terrestrial Radio Access (E-UTRA) and Evolved Universal Terrestrial Radio Access Network (E-UTRAN); Physical Channels and Modulation (Release 8), which is incorporated by reference herein in its entirety.

There is an increased focus on extending and optimizing the 3GPP LTE Rel. 8 radio access technologies for providing higher data rates at very low cost. These teachings are relevant to LTE-Advanced system (LTE-A) which will most likely be part of LTE Rel. 10. LTE-A will be a local area optimized radio system fulfilling the ITU-R requirements for IMT-Advanced while keeping the backward compatibility with LTE Rel 8. 3GPP has initiated a study item on LTE-A. It is commonly understood that SU-MIMO with 2 or 4 transmission antennas at the UE will be part of LTE-A [see for example LTE Advanced Workshop; Summary of LTE Advanced Requirements presented at the Workshop, Source: 3GPP TSG RAN Chairman; Doc. Number REV-080058].

It can be assumed that higher data rates set also increased requirement for control signalling. The UL control signals such as ACK/NACK, CQI and Scheduling request are transmitted on PUCCH (Physical Uplink Control Channel) in the absence of UL data. On PUCCH different UEs are multiplexed in the same frequency- and time resource by means of CDM. The above referenced 3GPP TS 36.211 describes two ways of achieving that multiplexing: using different cyclic shifts of the same base CAZAC sequence (which is described with reference to PUCCH formats 2a and 2b); and/or using different time domain spreading code between blocks of symbols (which is described with reference to PUCCH formats 1a and 1b). These formats are detailed at Appendix A, which includes the relevant sections 5.4.1 through 5.4.3 of the above-referenced 3GPP TS 36.211 document and definitions, symbols and abbreviations used therein.

Instantaneous channel state required for closed loop schemes is not available on PUCCH (FDD mode), and so open loop transmission is considered herein. Such an implementation needs to address two issues: UL measurement capability; and DL signalling arrangement. It is noted that it may be possible to arrange a few closed-loop signalling bits in the DL resource allocation grant transmitted on PDCCH (at the expense of system complexity and DL overhead), at least in the case when ACK/NACK signalling is related to dynamically scheduled DL data. However, economical arrangement of the needed measurement capability appears difficult if not impossible.

Open loop transmit diversity needs orthogonal resources for different transmit antennas (otherwise, the transmit antennas will interfere each other). Due to the fact that CDM type of access is being used in the Rel. 8 PUCCH there is no additional (symbol) space available for the space time coding (this is the case in both frequency and time domain). Multiplexing capacity of ACK/NACK channel is limited by the number of reference signal (RS) sequences. The parallel ACK/NACK channels per slot (normal CP) equals to 3×12=36. This number equals to the number of RS symbols transmitted on PUCCH during one slot.

To the inventors' knowledge there is no specific proposals regarding open loop transmission diversity transmission in the UL for the PUCCH. The well-known Alamouti scheme (used e.g., in the DL of WCDMA systems) can be applied between two consecutive OFDMA symbols. However, as mentioned this technique cannot be used on the PUCCH, due to the fact that the available symbol space has been used to separate different UEs.

SUMMARY

According to one embodiment of the invention is a method that includes transmitting in a timeslot from a first antenna of a user equipment on a first physical uplink control channel using a first reference signal in a manner that multiplexes with other user equipments, and transmitting in the timeslot from a second antenna of the user equipment on a second physical uplink control channel using a second reference signal in a manner that multiplexes with other user equipments, wherein the first reference signal and the second reference signal comprises a cyclically shifted zero autocorrelation code and the second reference signal is orthogonal to the first reference signal by at least one of the cyclic shifts or a cover code applied to at least one of the first and the second reference signals.

According to another embodiment of the invention is a memory embodying a program of instructions that when executed by a processor result in actions directed toward transmitting orthogonal signals. In this embodiment of the invention, the actions include transmitting in a timeslot from a first antenna of a user equipment on a first physical uplink control channel using a first reference signal in a manner that multiplexes with other user equipments, and transmitting in the timeslot from a second antenna of the user equipment on a second physical uplink control channel using a second reference signal in a manner that multiplexes with other user equipments. In this embodiment, the first reference signal and the second reference signal each include a cyclically shifted zero autocorrelation code, and the second reference signal is orthogonal to the first reference signal by at least one of the cyclic shifts or a cover code applied to at least one of the first and the second reference signals.

According to yet another embodiment of the invention is a device that includes a transmitter, a processor and at least a first and a second antenna. The transmitter is configured to transmit in a timeslot from the first antenna on a first physical uplink control channel using a first reference signal in a manner that multiplexes with other devices, and the transmitter is further configured to transmit in the timeslot from the second antenna on a second physical uplink control channel using a second reference signal in a manner that multiplexes with other devices. The first and the second reference signals include zero autocorrelation codes. The processor is configured to cyclically shift the first and the second reference signals and to render the first and the second reference signals orthogonal to one another by at least one of the cyclic shifts or a cover code applied to at least one of the first and the second reference signals.

According to still another embodiment of the invention is a device that includes sending means, processing means and at least a first and a second radiating means. The sending means (e.g., a transmitter) is for transmitting in a timeslot from the first radiating means (e.g., a first transmit antenna) on a first physical uplink control channel using a first reference signal in a manner that multiplexes with other devices, and the sending means is further for transmitting in the timeslot from the second radiating means (e.g., a second transmit antenna) on a second physical uplink control channel using a second reference signal in a manner that multiplexes with other devices. The first and the second reference signals comprise zero autocorrelation codes. The processing means is for cyclically shifting the first and the second reference signals and for rendering the first and the second reference signals orthogonal to one another by at least one of the cyclic shifts or a cover code applied to at least one of the first and the second reference signals.

According to a further embodiment of the invention is a method that includes receiving in a timeslot on a first physical uplink control channel a first multiplexed signal from a first plurality of user equipments that includes a first reference signal, and receiving in the timeslot on a second physical uplink control channel a second multiplexed signal from a second plurality of user equipments that includes a second reference signal, wherein the first reference signal and the second reference signal comprises a cyclically shifted zero autocorrelation code and the second reference signal is orthogonal to the first reference signal by at least one of the cyclic shifts or a cover code applied to at least one of the first and the second reference signals, and mapping the first and the second reference signals to a first user equipment, said first user equipment being a member of both the first plurality and of the second plurality of user equipments.

According to a still further another embodiment of the invention is a device that includes a receiver and a processor. The receiver is configured to receive in a timeslot on a first physical uplink control channel a first multiplexed signal from a first plurality of user equipments that includes a first reference signal. The receiver is further configured to receive in the timeslot on a second physical uplink control channel a second multiplexed signal from a second plurality of user equipments that includes a second reference signal, wherein the first reference signal and the second reference signal comprises a cyclically shifted zero autocorrelation code and the second reference signal is orthogonal to the first reference signal by at least one of the cyclic shifts or a cover code applied to at least one of the first and the second reference signals. The processor is configured to map the first and the second reference signals to a first user equipment, said first user equipment being a member of both the first plurality and of the second plurality of user equipments

BRIEF DESCRIPTION OF THE DRAWINGS

The foregoing and other aspects of the exemplary embodiments of this invention are made more evident in the following Detailed Description, when read in conjunction with the attached Drawing Figures.

FIG. 1 is a reproduction of a prior art table showing resource allocation for the case of 18 ACK/NACK channels with normal cyclic prefix that may be used with certain embodiments of the invention.

FIG. 2 is a table showing indices for CQI channel and cyclic shifts of those channels for use with an embodiment of the invention.

FIG. 3 is a schematic diagram illustrating certain devices that may be used to implement embodiments of the invention detailed herein.

DETAILED DESCRIPTION

Figure 4:
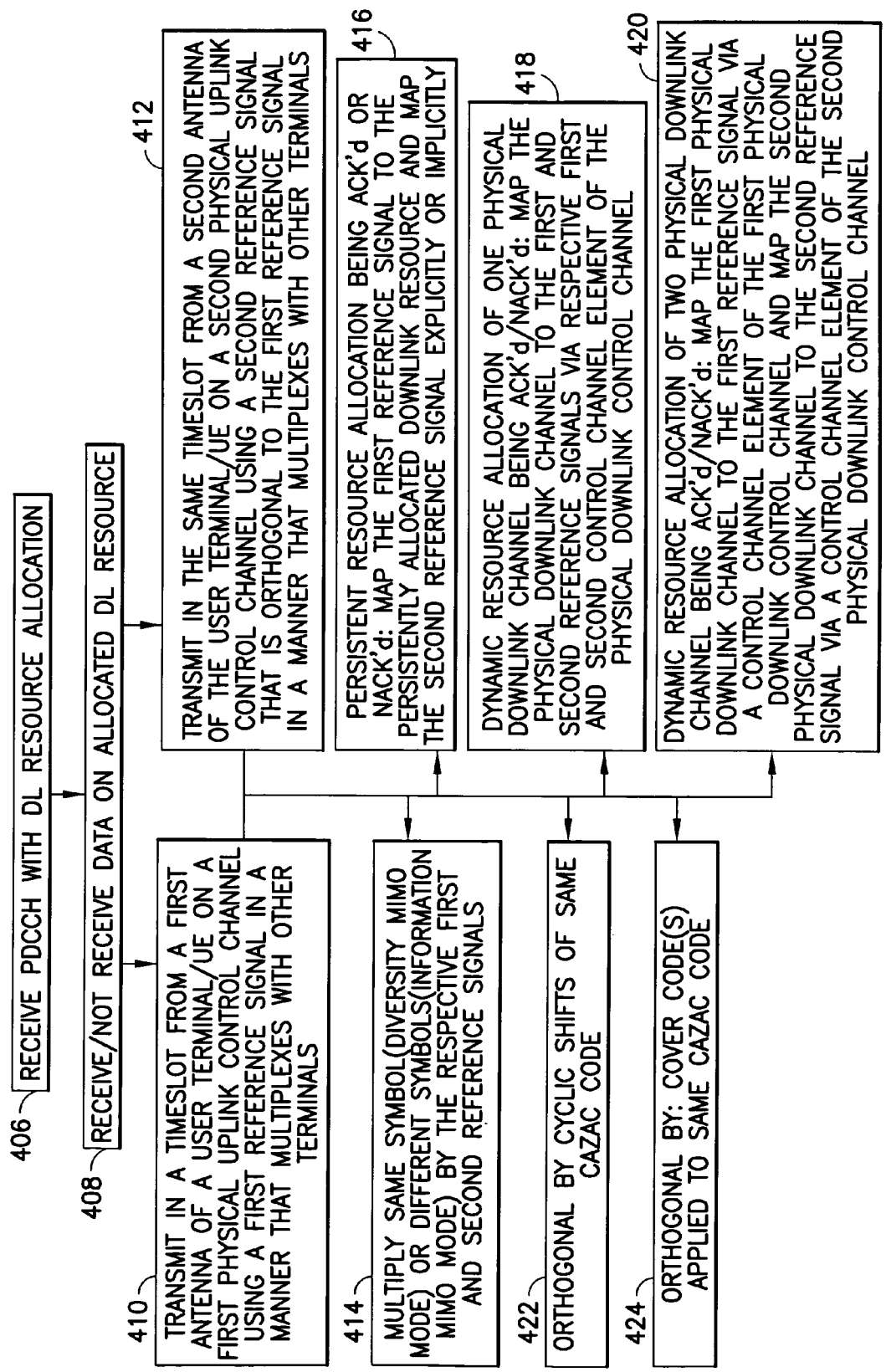
FIG. 4 is a logical flow diagram that illustrates the operation of a method, and the result of execution of computer program instructions by the data processor shown in FIG. 2.

The specific examples below detail a multi-antenna transmission arrangement for the PUCCH, but it is understood that such examples are non-limiting and these teachings may be readily extended to other wireless communication systems that use different terminology than that used herein to correspond to an LTE system.

In an exemplary aspect, embodiments of these teachings provide a separate PUCCH channel for different transmit antennas of the same UE. According to these teachings the UE can transmit in either diversity MIMO mode by transmitting the same symbol/block of bits from different antennas/channels, or information MIMO mode by transmitting different symbols/blocks of bits from different antennas/channels.

First consider specific examples for ACK/NACK transmissions. The current ACK/NACK channelization on the PUCCH is based on the staggered-type of ACK/NACK structure, as shown in the example of FIG. 1, which is reproduced from Table 3 of 3GPP TSG RAN WG1 Meeting #51 bis, Sevilla, Spain, Jan. 14-18, 2008 (document R1-080035), where the index k represents the $k^{th}$ ACK/NACK resource. At FIG. 1 there are a cell specific cyclic shift offset parameter and delta-parameter which is the cyclic shift difference between two adjacent ACK/NACK resources broadcast in the cell (e.g., with system information). Orthogonal cover codes and cyclic shifts of the CAZAC root sequence can be used e.g., based on the channelization example shown in FIG. 1. This same channelization structure may be used for ACK/NACK (both dynamically scheduled and persistent) and SRI according to these teachings.

As background for the LTE system and these examples, the eNodeB sends on a physical downlink control channel PDCCH an allocation table AT that allocates to multiple UEs in the cell either or both of UL and DL resources. Regarding the resource allocation of UL control channel, an individual UE reads its allocation, and maps that DL allocation to a UL control resource over which it will send its ACK/NACK for the data the UE is scheduled to receive on that allocated DL resource. The ACK/NACK resource thereby is derived from the DL control resource PDCCH over which the eNodeB sent the original allocation. To facilitate maximum flexibility of resource scheduling by the eNodeB, the eNodeB can allocate its radio resources dynamically via the PDCCH, in which the allocation is valid only for one time slot. Where there is a larger volume of control data or an anticipated stream of regularly spaced data to or from the same UE, the eNodeB may choose to make a resource allocation sent on the PDCCH a persistent allocation, which depending on implementation may persist for two timeslots, three timeslots, etc. or indefinitely until the allocation is cancelled. Cancellation of a persistent allocation may be explicit by control signalling from the eNodeB, or it may be implicit such as by a NACK from the UE followed by a failure of the eNodeB to re-transmit the NACK'd data.

ACK/NACK for persistent allocations and for SRI are first considered. According to an embodiment of the invention for the case of the UE sending an ACK/NACK for persistently scheduled data and for the UE sending a scheduling request indicator SRI (by which the UE informs the eNodeB that it would like a UL resource allocation), higher layer signalling from the eNodeB (or higher, see FIG. 3) is used to configure the applied ACK/NACK channel (i.e., the index k which represents the ACK/NACK resource) to be used when signaling ACK/NACK or SRI. According to these teaching, this higher layer signalling is extended so as to contain multiple ACK/NACK channels, i.e., one for each transmission antenna (e.g., k=3 and k=6 with two transmit antennas, k=2 and k=8 and k=15 with three antennas,) and each ACK/NACK resource allocated to the same UE for the same ACK/NACK or SRI being orthogonal to one another. This extension to the higher layer signalling may be explicit or it may be implicit in that existing signaling of one value for k remains unchanged but both the UE and the eNodeB understand that the applied ACK/NACK resources for additional antennas is relative to the explicitly signaled ACK/NACK/SRI resource which applies to the first UE antenna. For example, the explicitly signaled index k may be used for the $1^{st}$ antenna ACK/NACK/SRI transmission, and (k+1) is implicitly understood for the $2^{nd}$ antenna ACK/NACK/SRI transmission.

Now consider several exemplary embodiments of the invention related to sending an ACK/NACK for data received by the UE in a dynamic resource allocation. In a first exemplary embodiment for the case of dynamically scheduled data, the ACK/NACK resource is based on the first (e.g., the lowest) control channel element CCE of the PDCCH. In LTE Rel. 8, the possible values for the number of CCEs to construct the PDCCH equals to 1, 2, 4 and 8. In the case when more than 1 CCE is used and assuming that each CCE maps to a dedicated ACK/NACK resource, one or more ACK/NACK resources remain un-used. According to this embodiment the open loop transmit diversity is specified as follows.

The first transmit antenna utilizes the ACK/NACK channel corresponding to the lowest CCE. Denote for simplicity this ACK/NACK channel as k. The second transmit antenna then utilizes the $(k+1)^{th}$ ACK/NACK channel. If there is a third transmit antenna it will send the ACK/NACK on the $(k+2)^{th}$ ACK/NACK channel, and so forth for how ever many transmit antennas the UE is putting into use. Note that inherently, this embodiment is limited to the case where more than one CCE is being used as open loop transmission diversity requires in this example more than one CCE from which to map the ACK/NACK resources.

In a second exemplary embodiment of open loop transmit diversity for the case of dynamically scheduled data, the UE's first transmit antenna utilizes the ACK/NACK channel corresponding to the lowest CCE. Denote the cyclic shift and the orthogonal cover of this ACK/NACK channel respectively as k and l. Then the UE's second transmit antenna uses as an ACK/NACK channel the resources with cyclic shift resource k+1 and orthogonal cover l. Unlike the first embodiment immediately above, there is no limitation on the used CCE aggregation, only up to $\Delta_{shift}^{PUCCH}$ (which is either 2 or 3) transmit antennas can be supported. $\Delta_{shift}^{PUCCH}$ is the cyclic shift difference between two adjacent ACK/NACK resources using the same orthogonal cover sequence. As currently defined in section 5.4.1 of 3GPP TS 36.211 referenced above, $$\Delta_{shift}^{PUCCH} \in \begin{cases} \{[1], 2, 3\} & \text{for normal cyclic prefix} \\ \{2, 3\} & \text{for extended cyclic prefix}, \end{cases}$$

$$\delta_{offset}^{PUCCH} \in \{0, 1, \ldots, \Delta_{shift}^{PUCCH} - 1\}$$

with the specific values being set by higher layers.

In a third exemplary embodiment of open loop transmit diversity for the case of dynamically scheduled data, the UE's first transmit antenna utilizes the ACK/NACK channel corresponding to the lowest CCE, such as is currently specified in Rel'8. The UE's second transmit antenna utilizes an additional ACK/NACK channel from a pool of ACK/NACK channels that are reserved for the second transmit antenna transmission. The eNodeB can reserve this pool of ACK/NACK channels, either semi-permanently to be changed by system information broadcasts and so known by all UEs or reserves them itself without broadcasting. For the first variation where the pool is known at least to all UEs with multiple transmit antennas, the particular ACK/NACK channel from the pool of ACK/NACK resources reserved for second transmit antenna resources may correspond to the lowest CCE. Said another way, the lowest CCE maps a first ACK/NACK resource that is outside the pool and also maps to a second ACK/NACK resource that is in the pool reserved for ACK/NACK resources for second antenna transmission. In the second variation where the UEs are unaware of which ACK/NACK resources make up the reserved pool, the eNodeB persistently allocates to a group of UEs the particular ACK/NACK resource that an individual UE uses for its second antenna transmission, but this persistent allocation to the group of UEs is with the scheduling restriction that the UEs in the group of UEs do not simultaneously use the PUCCH ACK/NACK channel for second antenna transmissions. Either of these variations can be readily extended to more than two transmit antennas.

Now consider an exemplary embodiment of the invention for CQI signalling by the UE. In the LTE system, CQI transmission is based on PUCCH format 2, 2a or 2b (see TS 36.211, incorporated by reference above). FIG. 2 shows that radio resources on which CQI is signaled are indicated as the jth CQI channel having cyclic shifts CS given by CS index. The value of the CQI channel index j of FIG. 2 is explicitly signaled via higher layers (eNodeB or higher). For open loop transmit diversity of CQI reporting according to this exemplary embodiment, multiple CQI resources are allocated for the given UE. From a spatial perspective, different antennas utilize different CQI resources (e.g., assuming the eNodeB signals j=4 and also j=5, the UE's first antenna utilizes the fourth CQI channel, and the UE's second antenna utilizes the fifth CQI channel). In an alternative embodiment for CQI, the eNodeB signals only one value for j and different ones of the UE antennas utilize consecutive CQI resources, starting from the allocated CQI resource (e.g. the eNodeB signals j=4, the UE's first antenna uses the fourth CQI channel and the UE's second antenna uses the fifth CQI channel). In another alternative embodiment for CQI, the eNodeB signals only one value for j and different ones of the UE antennas utilize consecutive cyclic shift resources as CQI resources, starting from the allocated cyclic shift resource (e.g. the eNodeB signals j=4, the UE's first antenna uses the fourth CQI channel with cyclic shift index 6 and the UE's second antenna uses the fourth CQI channel with cyclic shift index 7). As above, these teachings are readily extended to more than two UE antennas.

Embodiments of the invention detailed above improve coverage of the PUCCH due to the additional space diversity gain and increase its capacity due to improved link performance (PUCCH is interference limited). They also enable a higher UL PUCCH payload due to the increased symbol space (additional spatial layer). While there may be some reduced multiplexing capacity, this can be compensated at least partially by the higher payload. But note that with dynamic ACK/NACK signalling, the multiplexing capacity is not degraded, but rather un-used resources are just taken into use.

Reference is now made to FIG. 3 for illustrating a simplified block diagram of various electronic devices that are suitable for use in practicing the exemplary embodiments of this invention. In FIG. 3 a wireless network 301 is adapted for communication with an apparatus, such as a mobile communication device which may be referred to as a UE 310, via a network access node, such as a Node B (base station), and more specifically an eNodeB 312. The network 301 may include a network control element (NCE) 314 that may include the MME/S-GW functionality shown in FIG. 3, and which provides connectivity with another network, such as a telephone network and/or a data communications network (e.g., the internet). The UE 310 includes a data processor (DP) 310A, a memory (MEM) 310B that stores a program (PROG) 310C, and a suitable radio frequency (RF) transceiver 310D for bidirectional wireless communications with the eNodeB 312, which also includes a DP 312A, a MEM 312B that stores a PROG 312C, and a suitable RF transceiver 312D. Those communications are over channels 311 detailed above, and the UE 310 sends its open loop diversity transmissions via two or more antennas 310E, although it may use one or more of the antennas 310E for reception without departing from these teachings. The eNodeB 312 has at least one transmit antenna 312E but typically an array to support its own MIMO transmission and reception to the multiple UEs that code-multiplex on the individual PUCCH's detailed above. The eNodeB 312 is coupled via a modem (not shown) and a data path 313 to a modem (not shown) of the NCE 314. That data path 313 may be implemented as an S1 interface known in the LTE system. An instance of an X2 interface (not shown) may be present for coupling to another eNodeB (not shown). At least the PROGs 310C, 312C may be assumed to include program instructions that, when executed by the associated DP 310A, 312A, enable the electronic device to operate in accordance with the exemplary embodiments of this invention, as detailed above and in the process diagram described below.

The exemplary embodiments of this invention may be implemented at least in part by computer software executable by the DP 310A of the UE 310, or by hardware, or by a combination of software and hardware (and firmware) of the UE 310. Similarly, other exemplary embodiments of this invention may be implemented at least in part by computer software executable by the DP 312A of the eNodeB 312, or by hardware, or by a combination of software and hardware (and firmware) of the eNodeB 312. The mapping as detailed above in the various embodiments is according to a relation stored in the respective local MEM 310B, 312B, some of which maybe specified in a relevant wireless standard for the system in use between the UE 310 and the eNodeB 312.

In general, the various embodiments of the UE 310 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 310B and 312B may be of any type suitable to the local technical environment and may be implemented using any suitable data storage technology, such as semiconductor based memory devices, flash memory, magnetic memory devices and systems, optical memory devices and systems, fixed memory and removable memory. The DPs 310A and 312A may be of any type suitable to the local technical environment, and may include one or more of general purpose computers, special purpose computers, microprocessors, digital signal processors (DSPs) and processors based on a multicore processor architecture, as non-limiting examples.

Typically there will be a plurality of UEs 310 serviced by the eNodeB 312, and these UEs multiplex their transmissions on the various PUCCHs to the eNodeB 312 using a code division multiplexing and the PUCCH formats set forth in Appendix A. The UEs 310 may or may not be identically constructed, but in general are all assumed to be electrically and logically compatible with the relevant network protocols and standards needed for operation in the wireless network 301.

Further details and implementations are described particularly below with reference to FIG. 4. From the perspective of the UE, exemplary embodiments of this invention encompass a method; an apparatus that includes a processor, memory, transmitter and receiver; and a memory embodying a computer program; that operate to transmit at block 410 of FIG. 4 in a timeslot from a first antenna of a user terminal/UE on a first physical uplink control channel using a first reference signal in a manner that multiplexes with other terminals, and also to transmit at block 412 of FIG. 4 in the same timeslot from a second antenna of the user terminal/UE on a second physical uplink control channel using a second reference signal that is orthogonal to the first reference signal in a manner that multiplexes with other terminals. Note that for embodiments specific to LTE, the first and second physical uplink control channels of blocks 410 and 412 are different instances of the PUCCH which are different resources though LTE refers to them as the same physical channel.

In one embodiment from the UE perspective, a same symbol multiplied by the respective first and second reference signals is transmitted from the respective first and second antennas. In another embodiment from the UE perspective, different symbols multiplied by the respective first and second reference signals are transmitted from the respective first and second antennas. These are shown at block 414 of FIG. 4.

In another embodiment from the UE perspective it is a SRI or a CQI that is transmitted from the first and second antennas, and in yet another embodiment from the UE perspective what is transmitted from the first and second antennas is either an ACK for data received in a persistently allocated downlink resource wherein at least the first reference signal maps to the persistently allocated downlink resource, or it is a NACK for data not received according to a persistently allocated downlink resource wherein at least the first reference signal maps to the persistently allocated downlink resource as seen at block 416. For these ACK/NACK embodiments, the UE receives (at block 408, prior to the transmitting from the first or the second antennas) data on at least one physical downlink channel and maps the at least one physical downlink channel to at least the first physical uplink control channel. That downlink channel may be allocated to the UE on a PDCCH at block 406. For an ACK/NACK embodiment where the data being ACK'd or NACK'd is received on only one dynamically allocated physical downlink channel as seen at block 418, the user terminal maps the physical downlink channel to the first reference signal via a first control channel element of the one physical downlink control channel and maps the physical downlink channel to the second reference signal via a second control channel element of the one physical downlink control channel. For an ACK/NACK embodiment where the data being ACK'd or NACK'd is received on a first and a second dynamically allocated physical downlink channel as seen at block 420, the user terminal maps the physical downlink channel to the first reference signal via a control channel element of the first physical downlink control channel and maps the physical downlink channel to the second reference signal via a control channel element of the second physical downlink control channel.

In another embodiment from the UE perspective, the first reference signal includes a zero autocorrelation code (which may be a constant amplitude zero autocorrelation CAZAC code) having a first cyclic shift and the second reference signal comprises the zero autocorrelation code having a second cyclic shift that renders it orthogonal to the first reference signal as seen at block 422. In yet another embodiment from the UE perspective, each of the first and the second reference signals include a same CAZAC code with a cell specific cyclic shift and the first and second reference signals are orthogonal by a cover code that the user terminal applies to at least one of them as seen at block 424. [Comment: 'cell-specific' should be removed from 424 in FIG. 4]

Note that the various blocks shown in FIG. 4 for a particular entity (UE or eNodeB) may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations may become apparent to those skilled in the relevant arts in view of the foregoing description, when read in conjunction with the accompanying drawings and the appended claims. For example, certain steps shown in FIG. 3 may be executed in other than the order shown, and certain of the computations described may be performed in other ways. However, all such and similar modifications of the teachings of this invention will still fall within the scope of this invention.

Further, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other types of wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

We claim:
1. A method comprising:
   transmitting in a timeslot from a first antenna of a user equipment on a first physical uplink control channel using a first reference signal in a manner that multiplexes with other user equipment;

transmitting in the timeslot from a second antenna of the user equipment on a second physical uplink control channel using a second reference signal in a manner that multiplexes with other user equipment; and wherein the first reference signal and the second reference signal comprises a cyclically shifted zero autocorrelation code and the second reference signal is orthogonal to the first reference signal by at least one of the cyclic shifts or a cover code applied to at least one of the first and the second reference signals, wherein a same symbol multiplied respectively by the first and the second reference signals is transmitted respectively from the first antenna and the second antenna, and wherein at least one physical downlink channel is allocated to the user equipment dynamically on a physical downlink control channel, and for the case where the at least one physical downlink channel is only one physical downlink channel, the user equipment maps the physical downlink channel to the first uplink control channel k via a first control channel element of the one physical downlink control channel and maps the physical downlink channel to the second physical uplink control channel k+1; and for the case where the at least one physical downlink channel is at least a first and a second physical downlink channel, the user equipment maps the physical downlink channel to the first reference signal via a control channel element of the first physical downlink control channel and maps the physical downlink channel to the second reference signal via a control channel element of the second physical downlink control channel.

2. The method of claim 1, wherein transmitting from the first antenna and transmitting from the second antenna comprises different symbols multiplied by the respective first and second reference signals.

3. The method of claim 1, wherein transmitting from the first and from the second antennas comprises one of:
transmitting a scheduling request indicator; or
transmitting an acknowledgement for data received in a persistently allocated downlink resource wherein at least the first reference signal maps to the persistently allocated downlink resource; or
transmitting a negative acknowledgement for data not received according to a persistently allocated downlink resource wherein at least the first reference signal maps to the persistently allocated downlink resource.

4. The method of claim 1, wherein transmitting from each of the first and the second antennas comprises transmitting a channel quality indicator.

5. The method of claim 3, where transmitting the acknowledgement or transmitting the negative acknowledgement comprises the first antenna using an acknowledgement/negative acknowledgement channel k of a control channel element, and the second antenna using an acknowledgement/negative acknowledgement channel k+1 of the control channel element.

6. A device comprising:
at least one processor; and
at least one memory including computer program code, where the at least one memory and the computer program code are configured, with the at least one processor, to cause the device to at least:
transmit in a timeslot from a first antenna on a first physical uplink control channel using a first reference signal in a manner that multiplexes with other devices;
transmit in the timeslot from a second antenna on a second physical uplink control channel using a second reference signal in a manner that multiplexes with other devices, wherein the first and the second reference signals comprise zero autocorrelation codes;
cyclically shift the first and the second reference signals and to render the first and the second reference signals orthogonal to one another by at least one of the cyclic shifts or a cover code applied to at least one of the first and the second reference signals, wherein a same symbol multiplied respectively by the first and the second reference signals is transmitted respectively from the first antenna and the second antenna; and
receive a dynamic allocation of at least one physical downlink channel, and
for the case where the at least one physical downlink channel is only one physical downlink channel, map the physical downlink channel to the first physical uplink control channel k via a first control channel element of the one physical downlink control channel and map the physical downlink channel to the second physical uplink control channel k+1; and
for the case where the at least one physical downlink channel is at least a first and a second physical downlink channel, map the physical downlink channel to the first reference signal via a control channel element of the first physical downlink control channel and to map the physical downlink channel to the second reference signal via a control channel element of the second physical downlink control channel.

7. The device of claim 6, wherein the at least one memory including the computer program code is configured with the at least one processor to cause the device to transmit from the respective first and second antennas different symbols multiplied by the respective first and second reference signals.

8. The device of claim 6, wherein the at least one memory including the computer program code is configured with the at least one processor to cause the device to transmit the first and second reference signals with one of:
a scheduling request indicator; or
an acknowledgement for data received at the device in a persistently allocated downlink resource, wherein the at least one memory including the computer program code is configured with the processor to cause the device to map at least the first reference signal to the persistently allocated downlink resource; or
a negative acknowledgement for data not received at the device according to a persistently allocated downlink resource, wherein the at least one memory including the computer program code is configured with the processor to cause the device to map at least the first reference signal to the persistently allocated downlink resource.

9. The device of claim 6, wherein the at least one memory including the computer program code is configured with the at least one processor to cause the device to transmit the respective first and the second reference signals from the respective first and second antennas with a channel quality indicator.

10. A memory embodying a program of instructions that when executed by a processor result in actions directed toward transmitting orthogonal signals, the actions comprising:
transmitting in a timeslot from a first antenna of a user equipment on a first physical uplink control channel using a first reference signal in a manner that multiplexes with other user equipment;
transmitting in the timeslot from a second antenna of the user equipment on a second physical uplink control channel using a second reference signal in a manner that multiplexes with other user equipment;

wherein the first reference signal and the second reference signal comprises a cyclically shifted zero autocorrelation code and the second reference signal is orthogonal to the first reference signal by at least one of the cyclic shifts or a cover code applied to at least one of the first and the second reference signals, wherein a same symbol multiplied respectively by the first and the second reference signals is transmitted respectively from the first antenna and the second antenna, wherein:

at least one physical downlink channel is allocated to the user equipment dynamically on a physical downlink control channel, and for the case where the at least one physical downlink channel is only one physical downlink channel, the user equipment maps the physical downlink channel to the first reference signal via a first control channel element of the one physical downlink control channel and maps the physical downlink channel to the second reference signal via a second control channel element of the one physical downlink control channel; and for the case where the at least one physical downlink channel is at least a first and a second physical downlink channel, the user equipment maps the physical downlink channel to the first reference signal via a control channel element of the first physical downlink control channel and maps the physical downlink channel to the second reference signal via a control channel element of the second physical downlink control channel.

11. The memory of claim 10, wherein transmitting from the first antenna and transmitting from the second antenna comprises different symbols multiplied by the respective first and second reference signals.

12. The memory of claim 10, wherein transmitting from the first and from the second antennas comprises one of:
    transmitting a scheduling request indicator; or
    transmitting an acknowledgement for data received in a persistently allocated downlink resource wherein at least the first reference signal maps to the persistently allocated downlink resource; or
    transmitting a negative acknowledgement for data not received according to a persistently allocated downlink resource wherein at least the first reference signal maps to the persistently allocated downlink resource.

* * * * *